E. D. Wood,
Rotary Steam Valve.
Nº 76,682. Patented Apr. 14, 1868.

Witnesses;
Geo. M. Weaver
John G. Crocker

Inventor;
Enas. D. Wood

United States Patent Office.

ENOS D. WOOD, OF UTICA, NEW YORK.

Letters Patent No. 76,682, dated April 14, 1868.

IMPROVEMENT IN ROTARY VALVES.

*The Schedule referred to in these Letters Patent and making part of the same.*

TO ALL WHOM IT MAY CONCERN:

Be it known that I, ENOS D. WOOD, of Utica, New York, have invented a new and useful Improvement in Valves for Steam-Engines; and I do hereby declare that the following is a full, clear, and exact description of my said invention, and of the mode of operation of the same, reference being had to the annexed drawings, making a part of this specification, in which—

Figure 1:
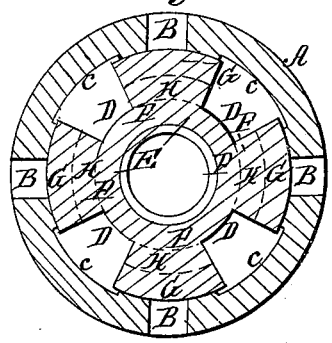

Figure 1 represents a cross-section of the valve-casing and an end view of the valves.

Figure 2:
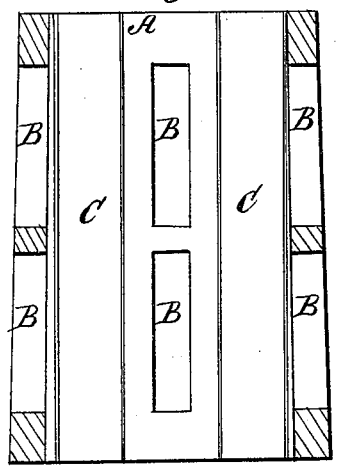

Figure 2, a longitudinal section of the casing.

Figure 3:
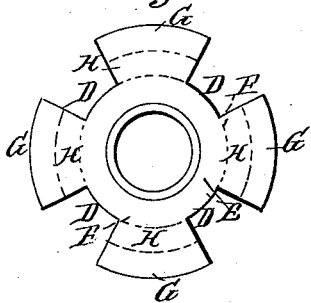

Figure 3, an end view of the hub and valves; and

Figure 4:
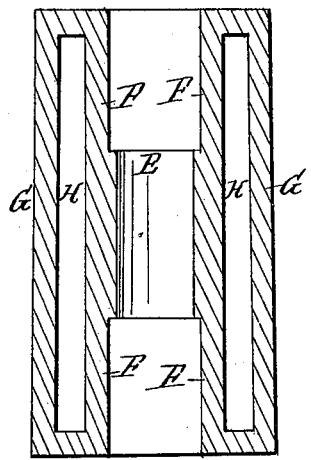

Figure 4, a longitudinal section of the same.

A is the valve-casing or sleeve.

B B are the steam-ports therein.

C C, chambers on the inside of the casing.

D D, parts of the circular valve cut away.

E is the hub of the valves.

F F, arms connecting the hub with the valves.

G G, the valves.

H H, openings through the valves.

My improved valve is of the rotating or oscillating form, and may be used for inlet and exhaust or governor-valves, and especially for cut-off valves.

I make the valve-casing or sleeve in the ordinary form, circular, and slightly tapering, with the ports cut through the sides, while a space is cut away on the inside, between the ports, so as to form chambers or recesses C C therein from end to end of the casing.

Instead of making the valve circular also, with ports through it, corresponding with those in the casing, I cut away the periphery down to the hub, as seen at D D, leaving between such spaces a separate valve, G, for each port in the casing. These valves G are connected with the hub E by the arms F F, leaving the space H between the hub E and the valve G, as seen in the drawing.

The purposes of these improvements and their value will be obvious.

By removing the inner surface of the casing at C, unnecessary wear of the valve and casing, and much friction, are obviated, while the steam passing through such spaces or chambers C C also serves to lubricate and balance the valves. By dividing the circular valve into longitudinal parts equal in number to the ports in the casing, the same effect is produced—less wear and friction—while a more perfect seat for the valve is obtained, and by connecting the valves to the hub by the arms F F, instead of making them solid with the hub, elasticity is given to the valves, which prevents the setting or binding of the valve in the casing, especially at the centre of the valve, as is the case where the valve is in the usual form, solid, with ports only, and there can be no yielding of the parts. And the openings H H at the same time allow the steam to pass freely through the valve, and thus render it perfectly self-balanced.

Instead of connecting the valves with the hub by the arms F, the valves may be separate, and set in slots in the hub, or the ends of the arms F may be set in holes in the valves, with springs between the parts, that is, in the holes or slots; and, instead of the arms being cast with the hub, they may be of wrought iron or steel, properly attached to the hub and valves, to give greater elasticity to the valves.

Having thus described my invention, what I claim therein as new, and desire to secure by Letters Patent, is—

The valves G, with the openings H between them and the hub E, constructed substantially as described.

ENOS D. WOOD.

Witnesses:
GEO. M. WEAVER,
JOHN G. CROCKER.